United States Patent [19]

Nelson

[11] Patent Number: 4,919,522
[45] Date of Patent: Apr. 24, 1990

[54] OPTICAL SWITCH HAVING BIREFRINGENT ELEMENT

[75] Inventor: Bruce N. Nelson, South Boston, Mass.

[73] Assignee: Geo-Centers, Inc., Newton Centre, Mass.

[21] Appl. No.: 160,126

[22] Filed: Feb. 25, 1988

[51] Int. Cl.⁵ ............................ G02F 1/03; G02B 5/30
[52] U.S. Cl. .................................... 350/389; 350/382; 350/390
[58] Field of Search ................ 350/382, 384, 389, 390

[56] References Cited

U.S. PATENT DOCUMENTS

| Re. 28,971 | 9/1976 | Kumada et al. | 350/389 |
|---|---|---|---|
| 3,481,661 | 12/1969 | Harris | 350/382 X |
| 3,536,375 | 10/1970 | Mansell | 350/382 X |
| 4,465,969 | 8/1984 | Tada et al. | 350/390 X |
| 4,554,449 | 11/1985 | Taniuchi et al. | 250/227 |
| 4,595,876 | 6/1986 | Kuhara et al. | 350/388 X |
| 4,631,402 | 12/1986 | Nagatsuma et al. | 250/231 R |
| 4,698,497 | 10/1987 | Miller et al. | 250/231 R |
| 4,734,576 | 3/1988 | Agoston et al. | 250/225 |

FOREIGN PATENT DOCUMENTS 748654 12/1966 Canada .................. 350/382

OTHER PUBLICATIONS

Non-Invasive Electro-Magnetic Field Sensor, by B. N. Nelson, C. Menzel and T. G. DiGuisseppe, Published by AF Wright Aeronautical Laboratories, Final Report for period May 1985–May 1986.

A Fibre Optic Electric Field Sensor Using the Electrooptic Effect of $Bi_4Ge_3O_{12}$, by K. Shibata, published by IEE given at the First International Conference on Optical Fiber Sensors, Apr. 26, 1983.

Primary Examiner—Rodney B. Bovernick
Assistant Examiner—Terry S. Callaghan
Attorney, Agent, or Firm—Wolf, Greenfield & Sacks

[57] ABSTRACT

An electrically controlled optical switch employs an electro-optical crystal of the kind exhibiting birefringence in each of two different light paths when the crystal is disposed in orthogonally oriented electric fields, with each light path being sensitive to a different one of the two electric fields and each path having its own set of fast and slow axes. A crystal of bismuth germanium oxide has those properties. Electrodes are provided for separately establishing each of the two electric fields and control circuitry allows only one field at a time to be established. Polarizers are situated at opposite ends of the electro-optical crystal in alignment with each of the two paths. Adjacent one end of the crystal are disposed a beam splitter and a right angle prism. The prism is arranged to receive some of the light entering the beam splitter and reflect that light along one of the paths of the crystal while another portion of the entering light proceeds through the beam splitter into the other path of the crystal. The polarizers block the light in one path while enabling light to emerge from the other path.

18 Claims, 3 Drawing Sheets

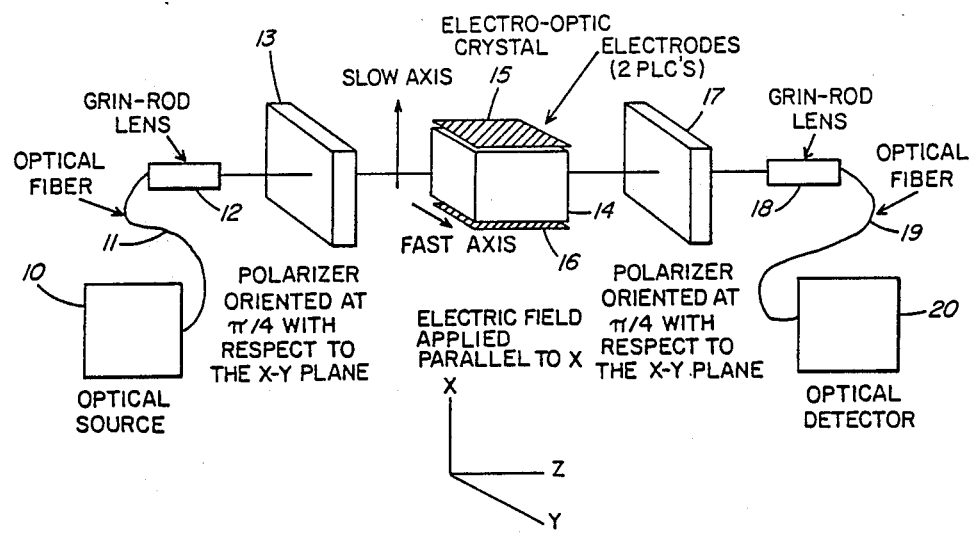
*FIG. 1*
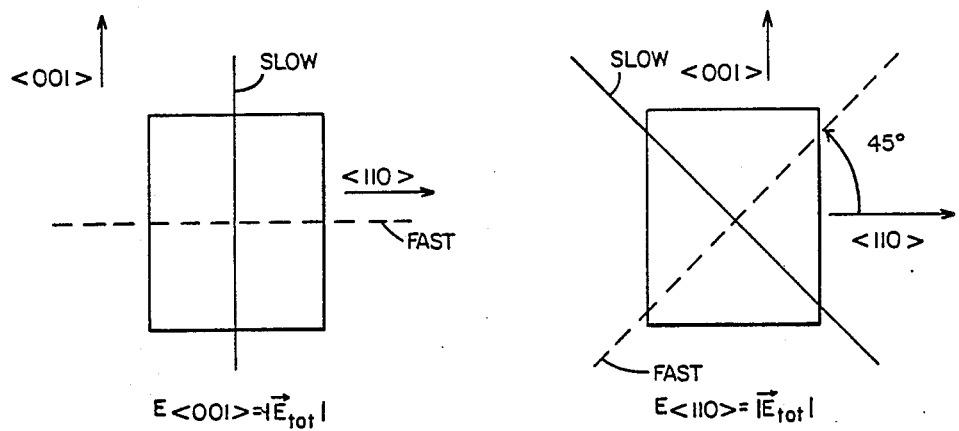
*FIG. 2A*  *FIG. 2B*

OPTICAL SWITCH HAVING BIREFRINGENT ELEMENT

FIELD OF THE INVENTION

This invention relates in general to the transmission of optical signals. More particularly, the invention pertains to electrically controlled apparatus for switching optical signals at speeds in the order of one microsecond. The switching apparatus is especially suitable for applications where the optical signals are transmitted by multimode optical fibers.

BACKGROUND OF THE INVENTION

Fast optical switching has remained an unsolved problem for mode fiber optic communication and sensor networks. Slow opto-mechanical switches are known in which the free end of an optical fiber is movable from one station to another. At each station, the movable end is aligned with the fixed end of another optical fiber. Such opto-mechanical switches operate at slow speeds (in the order of 10 milliseconds) which severely limit their utility. Moreover, repeated flexure of the movable free end of the optical fiber tends to induce fatigue and ultimately results in breakage of the fiber.

In contrast to the presently available optical switches, semiconductor electronic switches are available which switch electrical signals at the high speeds required in communication networks. Fiber-optic analogs of those high speed electronic switches have yet to become available.

The short term solution to the lack of higher speed optical switches has been to convert the optical signals into electrical signals prior to switching by electronic switching devices and then to reconvert the electrical signals into optical signals, after switching, for transmission along optical fibers. However, electronic switches are susceptible to the effects of electromagnetic interference which can prevent those switches from operating reliably. In addition, the electrical conductors which carry the electrical signals to and from the electronic switches are also affected by electromagnetic interference. Consequently, both the reliability of the electronic switch as well as the integrity of the electrical signals transmitted through the switch can be adversely affected by electromagnetic interference.

An optical switch offers inherent immunity to the effects of electromagnetic interference. The optical signals transmitted along the optical fibers are not perturbed by electromagnetic interference. Systems which use optical switches are able to operate reliably in environments where electronically switched systems have proved to be unreliable. Moreover, optical switches are more compatible with optical fiber networks than are electronic switches inasmuch as optical fibers can be connected directly to optical switches without requiring the intervention of converters to change the optical signals to electrical signals.

OBJECTS OF THE INVENTION

The principal objective of the invention is to provide an electrically controlled optical switch that operates at a switching speed of at least one microsecond.

Another objective of the invention is to provide an electrically controlled optical switch that is of simple construction and operates at switching speeds commensurate with the needs of modern optical communication and sensor networks.

A further object of the invention is to provide an optical switch of moderately high switching speed that is especially suitable for applications where the optical signals are transmitted by multimode optical fibers.

THE INVENTION

The invention resides in an electrically controlled optical switch employing a electro-optic crystal of the kind having two sets of fast and slow optical axes in the crystal, with one set of fast and slow axes being sensitive to a first electric field extending through the crystal in one direction along a crystal facet and the other set of fast and slow axes being angularly disposed with respect to the first set and being sensitive to a second electric field extending through the crystal in a direction orthogonal to the first electric field. The preferred crystal is a rectangular parallelepiped of bismuth germanium oxide (BGO) having facets extending through the crystal along the $<001>$, $<110>$, and $<\bar{1}10>$ crystal directions.

THE DRAWINGS

FIG. 1 schematically depicts an electro-optical light shutter whose basic arrangement is utilized in the invention.

FIG. 2A diagrammatically shows the orientation of the fast and slow axes in a BGO crystal disposed in an electric field extending in the $<001>$ direction.

FIG. 2B diagrammatically shows the orientation of the fast and slow axes in the BGO crystal when that crystal is situated in an electric field in the $<110>$ direction.

DETAILED DESCRIPTION OF THE PREFERRED EMBODIMENT OF THE INVENTION

Figure 3:
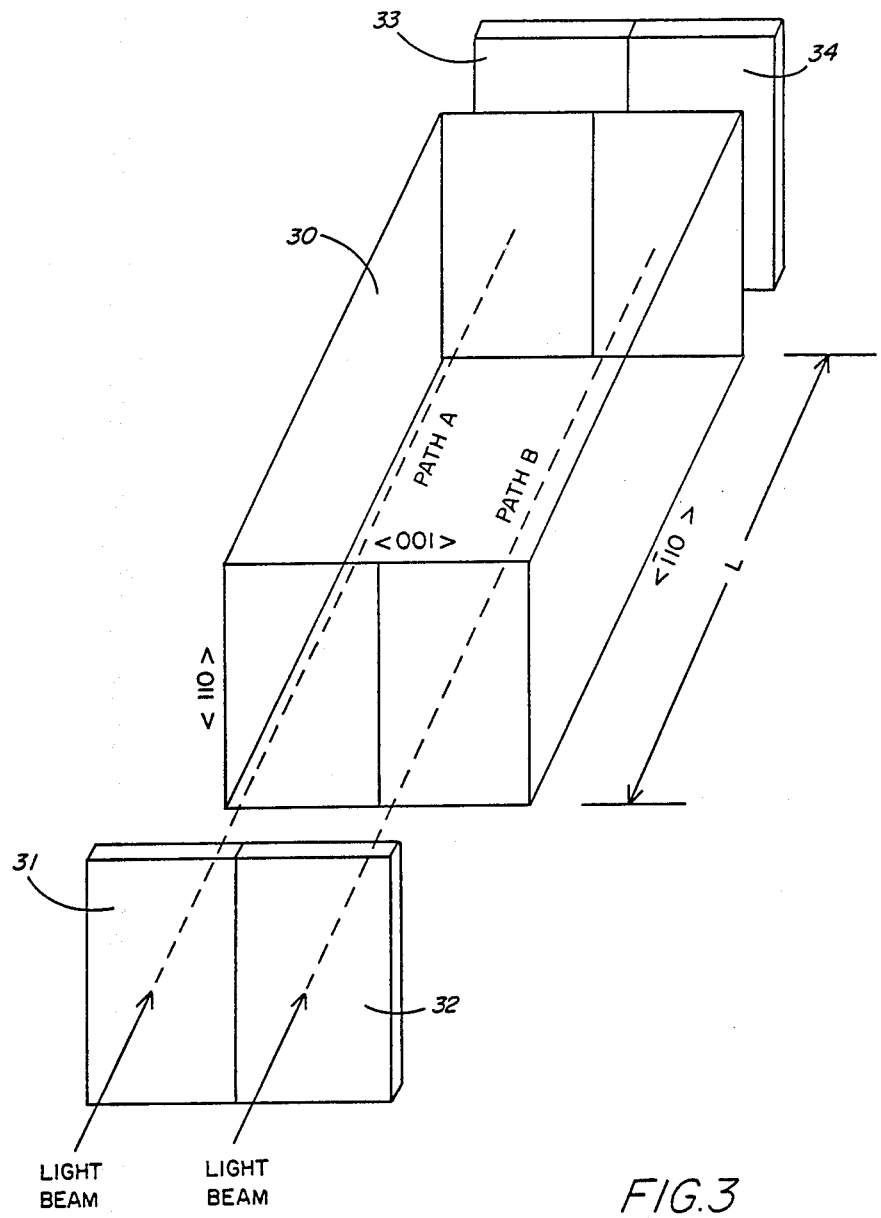
FIG. 3 is an exploded view which schematically depicts an arrangement that enables a single BGO crystal to be used to control two independent electro-optical shutters.

A better understanding of the invention can be obtained from consideration of the electro-optical light shutter schematically shown in FIG. 1 of the drawings. That basic arrangement is the foundation of the fast optical switch embodiments of the invention schematically depicted in FIGS. 4 and 5. In the FIG. 1 arrangement, a source 10 of illumination provides light that is preferably of a single wavelength or as close to monochromatic as it is feasible to obtain. Such a source may be a laser of the type that emits light that is principally of one wavelength. It is not necessary, however, that the emitted light be coherent. The light from source 10 is transmitted along an optical fiber 11 to a grin-rod lens 12. ( A grin-rod lens is a lens formed integrally with a graded index rod.) The light reaching grin-rod lens 12 emerges as a collimated beam that is directed toward a polarizer 13 which causes the light passing through it to emerge as plane polarized light. That polarized light is then incident upon an electro-optic crystal 14 which is of a nature such that when the crystal is situated in an electric field extending in the direction of the X axis, a beam of light polarized along the X axis propagates through the crystal at a slower speed than a beam of light polarized along the Y axis. In the FIG. 1 arrangement, that electric field is established by impressing a voltage differential between the plates 15 and 16. The difference in the speed of propagation of the polarized light through the crystal is due to an increase in the index of refraction along the X axis whereas the index of refraction remains unchanged for light polarized along the Y axis—that is, the electric field which extends along the X axis affects the index of refraction for X axis polarized light in proportion to the electric field gradient through the crystal in the X direction while the index of refraction for Y axis polarized light is virtually unaffected by the X axis electric field. Because X axis polarized light passes through the crystal at a slower speed and is retarded with respect to the Y axis polarized light passing through the crystal, the X axis is known as the "slow" axis and the Y axis is known as the "fast" axis.

A plane polarized beam of light polarized in the plane midway between the crystal's fast and slow axes can be deemed to have a component polarized along the X axis and a component of equal intensity polarized along the Y axis. When such a plane polarized beam is incident on the crystal 14, a phase shift between the polarized X axis component and the polarized Y axis component occurs as the beam passes through the crystal. The phase shift between those two components of the emergent beam is proportional to the strength of the X axis electric field and the length of the crystal; that phase shift is referred to as "electric field induced birefringence". The phase shift results in rotation of the beam's plane of polarization. By employing an electric field of suitable strength and cutting the crystal to the requisite length, the plane of polarization of the emergent beam can be rotated by any desired amount relative to the plane of polarization of the incident beam.

In the FIG. 1 arrangement, the polarizer 17 can be oriented to permit the emergent beam to pass through the polarizer when an electric field is established between plates 15 and 16 and to block passage of the emergent beam in the absence of the electric field. Alternatively, the polarizer can be oriented to block the passage of the emergent beam when an electric field is established between those plates and to pass the emergent beam in the absence of the electric field. In either orientation, the arrangement can be utilized as a light shutter, with one orientation acting as a normally open shutter and the other orientation acting as a normally closed shutter. To distinguish polarizer 17 from polarizer 13, polarizer 17 is here denominated "the analyzer".

The light passing through the analyzer 17 is collected by a grin-rod lens 18 and is transmitted through a fiber optic light guide 19 to a light detector 20 that may, for example, be a photoelectric device which emits a signal indicating the open or closed state of the shutter.

The intensity of the light passing through the analyzer 17 is a function of the intensity $I_o$ of the light incident on the crystal 14 and the birefringence $\Gamma(E)$ induced in the crystal by the electric field between plates 15 and 16. Expressed mathematically, the transmitted intensity I is given by:

$$I = I_o \sin^2\left[\frac{\Gamma(E)}{2}\right] \quad (1)$$

Consider now a BGO (bismuth germanium oxide) crystal cut into a rectangular parallelepiped with edges parallel to the <001>, <110>, and <$\bar{1}$10> crystal directions, as indicated in FIG. 3. Shown in FIG. 2A is the orientation of the fast and slow crystal axes for an electric field extending through the crystal in the <001> direction. FIG. 2 shows the orientation of the fast and slow crystal axes for an electric field extending through the crystal in the <110> direction. The electric field in the <110> direction is orthogonal to the electric field in the <001> direction. From a comparison of those two figures, it is evident that the fast and slow axes in FIG. 2B are oriented at $\pi/4$ (i.e. 45°) with respect to the corresponding fast and slow axes of FIG. 2A. That property of the BGO crystal enables a single BGO crystal to be used to control two independent electro-optical shutters inasmuch as one shutter can be controlled by an electric field extending along the <001> crystal direction and the other shutter can be controlled by an electric field extending along the <110> crystal direction. FIG. 3 schematically shows the crystal and polarization optics orientations for such a shutter device.

The crystal 30, indicated in FIG. 3, is a rectangular parallelepiped with <001>, <110>, and <$\bar{1}$10> facets. A polarizer 31 whose plane of polarization is oriented along the <110> crystal direction is disposed at the light input end of the crystal alongside of a polarizer 32 whose plane of polarization is oriented at 45° with respect to the <110> direction. By that arrangement, two parallel but separate optical paths, A and B, are established in the crystal, as schematically indicated in FIG. 3. An analyzer 33 is situated in path A at the light output end of the crystal alongside of an analyzer 34 which is situated in path B. Analyzer 33 has its plane of polarization oriented along the <001> crystal direction whereas the plane of polarization of analyzer 34 is oriented at −45° with respect to the <110> crystal direction. That is, the plane of polarization of analyzer 33 is orthogonal to the plane of polarization of polarizer 31 and similarly, the plane of polarization of analyzer 34 is orthogonal to the plane of polarization of polarizer 32. In the the absence of an electric field in the <110> direction, transmission of polarized light in path A is blocked by analyzer 33 whereas in the absence of an electric field in the <001> direction, transmission of polarized light in path B is blocked by analyzer 34. Crystal 30 is of such length that upon the establishment of an electric field of sufficient strength in the <110> direction, some or all of the plane polarized light in path A is transmitted through analyzer 33 and that similarly, upon the establishment of an electric field of sufficient strength in the <001> direction, some or all of the plane polarized light in path B is transmitted through analyzer 34.

The induced birefringence of electro-optic crystal 30 as a function of the applied electric field is given by $$\Gamma(E) = \frac{2\pi n_o^3 r_{4l} L E}{\lambda} \quad (2)$$

for electric fields along the <110> direction and by $$\Gamma(E) = \frac{\pi n_o^3 r_{41} L E}{\lambda} \quad (3)$$

for electric fields along the <001> direction
where:
λ=the wavelength of the optical source
$n_o$=crystal index of refraction=2.07
$r_{41}$=electro optic coefficient=$1.03 \times 10^{-12}$m/V
L=crystal length (parallel to <110>)
E=the applied electric field strength
For an electro-optic crystal with electrodes attached to its surfaces, the applied electric field is found by:

$$E = V/d \quad (4)$$

where:
V=the applied voltage to the electrodes
d=the crystal thickness in the <001> or <110> direction.

Equations (2), (3) and (4) show that the induced birefringence and, consequently, the applied voltage required to open the shutter are dependent on the geometry of the electro-optic crystal.

Figure 4:
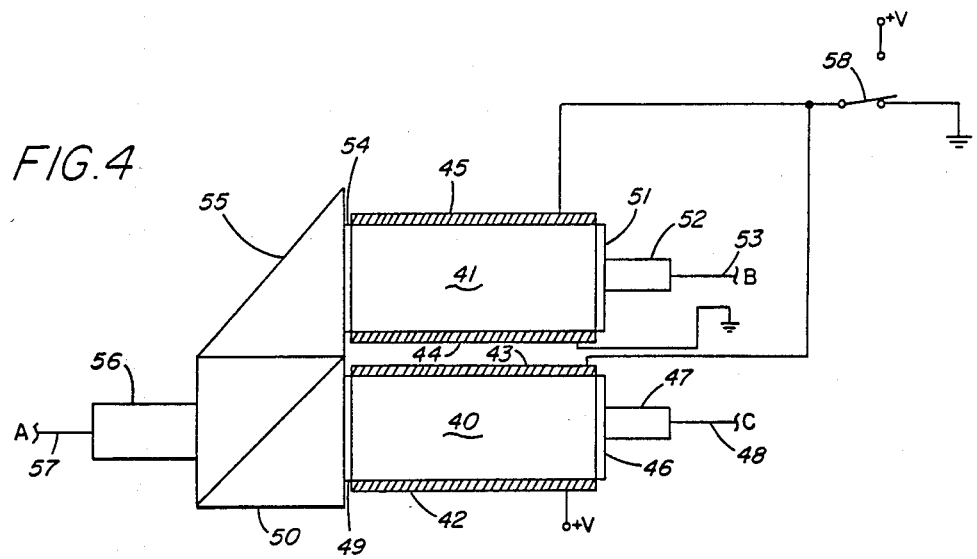
FIG. 4 depicts the scheme of an embodiment of the invention that employs two electro-optical crystals.

FIG. 4 schematically depicts a single pole double throw optical switch embodiment of the invention which utilizes two side by side electro-optic crystals 40 and 41. Each of those crystals is disposed between a pair of electrodes in the manner of crystal 14 of FIG. 1. In the FIG. 4 scheme, crystal 40 is disposed between electrodes 42 and 43 whereas crystal 41 is disposed between electrodes 44 and 45. The electrodes may be films of an electrically conductive substance, such as gold, silver, or copper, which is plated on opposed surfaces of the parallelepiped crystal. Abutted against one end of crystal 40 is a polarizer 46 carrying a grin-rod lens 47 from which extends an optical fiber light transmission line 48. At the opposite end of crystal 40, a polarizer 49 is interposed between the crystal's end and a beam splitter 50. In similar fashion, one end of crystal 41 abuts a polarizer 51 which carries a grin-rod lens 52 from which an optical fiber light transmission line 53 extends. At the other end of crystal 41 however, the corresponding polarizer 54 is interposed between the crystal's end and a right angle prism 55 which is arranged to reflect light from the beam splitter into crystal 4 and vice versa. Disposed in line with crystal 40 is a port of the beam splitter to which is secured a grin-rod lens 56 from which extends an optical fiber light transmission line 57.

In this configuration, electrodes 43 and 45 are grounded, as shown, through a two position switch 58. In the other position of switch 58, those two electrodes ar connected to a source of voltage, here indicated by the symbol +V. As is evident to those familiar with electronics, the voltage may be either positive or negative, although here represented by +V. The +V voltage is always impressed on electrode 42 whenever the apparatus is in operation and electrode 44 is always tied to ground, as indicated in the drawing. Inasmuch as the +V voltage is always impressed on electrode 43, when switch 51 is in the position depicted in FIG. 4, birefringence is induced in crystal 40 by the electric field between electrodes 42 and 43. That induced birefringence enables light to be transmitted through the lower shutter between optical fibers 48 and 57. In contrast, electrodes 44 and 45 are both grounded so that no electric field extends between those electrodes and, in consequence, no light can pass through the upper shutter.

When switch 58 is moved to the position where the +V voltage is impressed o electrodes 43 and 45, that impressed voltage raises electrode 43 to the same potential as electrode 42 and thereby extinguishes the electric field between those two electrodes while simultaneously an electric field is established between electrodes 44 and 45. The electric field between electrodes 44 and 45 induces birefringence in crystal 41 and thereby enables light to pass through the upper shutter. In the lower shutter, in contrast, crystal 40 reverts to the state of non-induced birefringence and, in consequence, no light can pass through the lower shutter.

It should be noted that a decrease in intensity occurs in the light transmitted through the FIG. 4 optical switch because the beam splitter is in the light transmission path. Assuming, for example, that unpolarized light from optical fiber 57 proceeds through grin-rod lens 56 into beam splitter 50, some of that light passes through the beam splitter and proceeds through polarizer 49 into crystal 40. Beam splitter 50 may, by way of example, be of the type having an inclined half silvered mirror. A portion of the light entering the beam splitter is reflected by the inclined mirror into right angle prism 55 where the light is again reflected and proceeds through polarizer 54 into crystal 41. If switch 58 is in the position depicted in FIG. 4, the lower shutter is open and enables light to proceed through crystal 40 and polarizer 46 into optical fiber terminal 48 while the upper shutter is closed and prevents light from reaching optical fiber terminal 53. On moving switch 58 to its other position, the lower shutter is closed while simultaneously the upper shutter is opened and enables light to proceed through crystal 41 and polarizer 51 into optical fiber terminal 53. An optical light transmission path to and from optical fiber terminal 57 can, therefore, be selectively established to either of terminals 53 or 48 by operation of the FIG. 4 optical switch.

Figure 5:
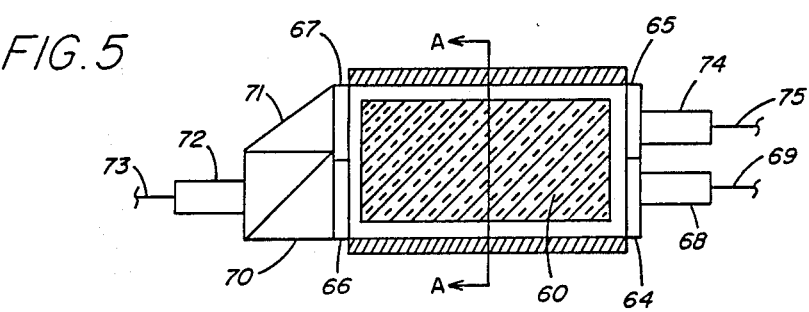
FIG. 5 depicts the scheme of the preferred embodiment of the invention which employs a single electro optic crystal and is an improvement upon the FIG. 4 embodiment.
Figure 6:
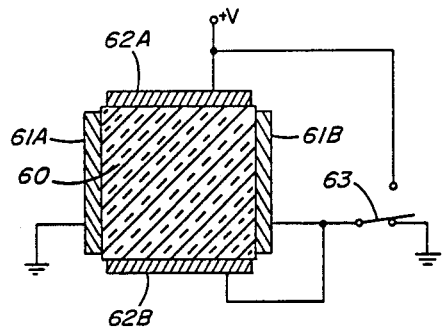
FIG. 6 is a cross-sectional view taken along the parting plane A—A of FIG. 5.

An improvement upon the FIG. 4 embodiment is schematically depicted in FIG. 5. The FIG. 5 embodiment of the invention is preferred because operation equivalent to or better than that of the FIG. 4 embodiment is obtained with but a single electro-optic crystal. FIG. 6 depicts a cross-sectional view of that single crystal taken along the parting plane A—A of FIG. 5.

In the FIG. 5 embodiment, the single electro-optic crystal 60 must be of the type having two sets of fast and slow optical axes in the crystal whereas in the FIG. 4 embodiment, crystals can be employed which are of the type having only a single set of fast and slow axis in each crystal. As indicated in FIG. 6, the electro optic crystal 60 is provided with two pairs of electrodes 61A, 61B, 62A, 62B. The electrodes may be metal films deposited on the crystal faces. Each pair of electrodes is arranged to establish an electric field through the crystal, with the field of one pair being orthogonal to the field of the other pair. The electrical control circuit for the electrodes is arranged, as indicated in FIG. 6, to enable the establishment of only one electric field at a time. For that purpose, electrode 61A is grounded and electrode 62A is connected to a source of voltage, indicated by the +V symbol. Electrodes 61B and 62B are both connected to the movable contact of a single pole, double throw switch 63 having one stationary contact connected to ground and its other stationary contact connected to the +V voltage source. With switch 63 in the position shown in FIG. 6, electrodes 61A and 61B are both at ground potential whereas electrode 62A is at a higher electric potential than electrode 62B. Consequently an electric field extends between electrodes 62A and 62 whereas electrodes 61A and 61B do not provide an electric field. When switch 63 is moved to its other position, the electric field established by electrodes 62A and 62B collapses and a new electric field is established by electrodes 61A and 61B.

The electro-optic crystal 60 of the FIG. 5 embodiment is arranged in the manner indicated in FIG. 3 with two side by side polarizers 64 and 65 at one end of the crystal and two side by side polarizers 66 and 67 at the opposite end of the crystal. That arrangement provides two paths A and B in the crystal. Abutted against polarizer 64 is a grin-rod lens 68 from which extends an optical fiber light transmission line 69. At the opposite end of the crystal, polarizer 66 is interposed between the crystal's end and a beam splitter 70. In the other path, polarizer 67 is interposed between the crystal's end and a right angle prism 71 which is arranged to reflect light from the beam splitter into crystal 60 and vice versa. In line with a port of beam splitter 70 is a grin-rod lens 72 from which extends an optical fiber light transmission line 73. At the opposite end of the crystal, in line with one of the crystal paths and abutting polarizer 65, is another grin rod lens 74 from which extends an optical fiber light transmission line 75.

In one position of switch 63, light is enabled to pass through the crystal between optical fibers 69 and 73 while light is prevented from being transmitted between optical fiber 75 and the right angle prism 71. In the other position of switch 63, light is enabled to pass through the crystal between optical fibers 73 and 75 while light is prevented from passing through the crystal between optical fibers 73 and 69. Thus, while one light transmission path through the crystal is open, the other light transmission path is shut. Inasmuch as optical fibers 69, 73, and 75 may be of the multimode type, the FIG. 5 embodiment enables multimode optical signals to be transmitted between those multimode fibers.

Obvious modifications that do not depart form the essentials of the invention are apparent to those skilled in the field of electro optics or in the science of crystallography. For example, where a crystal is found to have two sets of fast and slow axes with each set being sensitive to a different one of two electric fields and those electric fields are angularly disposed with respect to one another but are not orthogonal (i.e. are not mutually perpendicular), then the requisite modifications to obtain the described operation of the optical switch is apparent to those skilled in the field of electro-optics. In view of the changes in the invention that are obvious to such skilled persons, it is intended that the invention not be limited to the precise embodiments here described nor to the specific crystal compositions identified herein unless it should clearly appear otherwise from the appended claims. Rather, it is intended that the scope of the invention be construed in accordance with the accompanying claims, having due regard for changes that merely involve obvious equivalents and other changes that are obvious to the average person skilled in electro-optics or in crystallography.

Another embodiment does not require the permanent voltage +V applied to the electro-optic crystal. If polarizers 54 and 51 are crossed and polarizers 49 and 46 are aligned, then electrode 42 can be grounded and the application of voltage +V to electrodes 45 and 43 will result in activation of the switch.

I claim:
1. An electrically controlled optical switch comprising:
    (i) an electro optical crystal of the kind exhibiting birefringence in each of two different light paths when disposed in angularly oriented electric fields and wherein each light path is sensitive to a different one of the two electric fields and has its own set of fast and slow axes,
    (ii) means for separately establishing each of the angularly oriented electric fields with the crystal within the influence of the established electric field,
    (iii) first and second polarizer means disposed at opposite ends of the crystal in alignment with one of the light paths in the crystal,
    (iv) third and fourth polarizer means disposed at opposite ends of the crystal in alignment with the other light path in the crystal,
    (v) a beam splitter disposed adjacent one end of the crystal in alignment with one of the light paths in the crystal, one of the polarizer means being disposed between the crystal's end and the beam splitter, and
    (vi) an angular reflector disposed in alignment with the other light path in the crystal, the angular reflector being adjacent the beam splitter and at the same end of the crystal therewith, the angular reflector being disposed to reflect light into the beam splitter and the beam splitter being arranged to reflect light toward the angular reflector, and one of the polarizers in said other light path being disposed between the crystal's end and the angular reflector.

2. The electrically controlled optical switch according to claim 1, wherein the aforesaid angularly oriented electric fields are mutually perpendicular.

3. The electrically controlled optical switch according to claim 1, wherein
    the electro-optical crystal is a bismuth germanium oxide crystal.

4. The electrically controlled optical switch according to claim 1, further comprising
    (vii) light transmission means disposed adjacent opposite ends of the crystal in alignment with the light path whose extension passes through the beam splitter.

5. The electrically controlled optical switch according to claim 4, further comprising
    (viii) light transmission means disposed adjacent the end of the crystal remote from the angular reflector and in alignment with said other light path in the crystal.

6. An electrically controlled optical switch comprising:
    an electro-optic crystal of the kind exhibiting birefringence and having first and second sets of fast and slow optical axes in the crystal associated with first and second light paths through the crystal, respectively;
    means for separately establishing a first electric field and a second electric field, the second electric field being angularly disposed with respect to the first electric field;
    means for operatively orienting the crystal within the influence of the respective electric fields for achieving electro-optic effect in each set of fast and slow optical axes;

first and second polarizer means disposed at opposite ends of the crystal in alignment with the first light path; and third and forth polarizer means disposed at opposite ends of the crystal in alignment with the second light path;

wherein the first set of fast and slow optical axes are sensitive to the first electric field extending through the crystal in one direction, and the second set of fast and slow optical axes are angularly disposed with respect to the first set of fast and slow axes and are sensitive to the second electric field extending through the crystal.

7. The optical switch of claim 6, wherein the angularly disposed electric fields are mutually perpendicular.

8. The optical switch of claim 7, wherein the electro-optical crystal is a bismith germanium oxide crystal.

9. The optical switch of claim 8, wherein the electro-optical crystal is a bismith orthogermanate crystal.

10. The optical switch of claim 9, further comprising first and second light transmission means in alignment with the first light path, coaxially disposed adjacent to the crystal at opposite ends thereof, with the first and second polarizer means disposed between the first and second light transmission means and the crystal, respectively.

11. The optical switch of claim 10, further comprising third and fourth light transmission means in alignment with the second light path, coaxially disposed adjacent to the crystal at opposite ends thereof, with the third and fourth polarizer means disposed between the third and fourth light transmission means and the crystal, respectively.

12. The optical switch of claim 11, wherein the first and second light transmission means comprises grin-rod lens means.

13. The optical switch of claim 12, wherein the third and fourth light transmission means comprises grin-rod lens means.

14. The optical switch of claim 13, wherein the first and third light transmission means are the same element which is in alignment with the first light path.

15. The optical switch of claim 14, further comprising:

beam splitter means coaxially disposed adjacent one end of the crystal between the first and third light transmission means and the first polarizer means in alignment with the first light path through the crystal.

16. The optical switch of claim 15, further comprising:

angular reflector means coaxially disposed in alignment with the second light path through the crystal and adjacent to and at the same end of the crystal as the beam splitter means with the third polarizer means disposed between the end of the crystal and the angular reflector means so that light is reflected from the crystal toward the beam splitter and from the beam splitter toward the crystal.

17. The optical switch of claim 16, further comprising:

light source means for generating light to be transmitted to the crystal and light detector means for detecting light transmitted by the crystal.

18. The optical switch of claim 17, further comprising:

coupling means comprising fiber optic means for coupling the light source means and the light transmission means, and for coupling the light transmission means and the light detector means.

* * * * *

UNITED STATES PATENT AND TRADEMARK OFFICE
CERTIFICATE OF CORRECTION

PATENT NO. : 4,919,522
DATED : April 24, 1990
INVENTOR(S) : Nelson

It is certified that error appears in the above-identified patent and that said Letters Patent is hereby corrected as shown below:

Col. 1, line 16 - before "mode" insert -- multi --.

Col. 2, line 10 - change "a" to -- an --.

Col. 5, line 10 - change "⟨110⟩" to -- ⟨1̄10⟩ --.

Col. 5, line 47 - change "4" to -- 41 --.

Col. 5, line 54 - change "ar" to -- are --.

Col. 5, line 62 - change "43" to -- 42 --.

Col. 5, line 63 - change "51" to -- 58 --.

Col. 6, line 4 - change "o" to -- on --.

Col. 7, line 4 - change "62" to -- 62B --.

Signed and Sealed this

Twenty-fifth Day of June, 1991

*Attest:*

HARRY F. MANBECK, JR.

*Attesting Officer*  *Commissioner of Patents and Trademarks*